(12) United States Patent
Bergantino (10) Patent No.: US 11,216,351 B2
(45) Date of Patent: Jan. 4, 2022

(54) SYSTEM PROGRAM CHANGE DETECTION VIA PARALLEL MONITORING TECHNIQUES

(71) Applicant: EMC IP Holding Company LLC, Hopkinton, MA (US)

(72) Inventor: Matthew Bergantino, Tyngsboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/232,504

(22) Filed: Dec. 26, 2018

(65) Prior Publication Data

US 2020/0210324 A1  Jul. 2, 2020

(51) Int. Cl.
*G06F 11/30* (2006.01)
*G06F 11/36* (2006.01)
*G06F 9/54* (2006.01)
*G06F 9/451* (2018.01)

(52) U.S. Cl.
CPC ............ *G06F 11/302* (2013.01); *G06F 9/451* (2018.02); *G06F 9/542* (2013.01); *G06F 11/3664* (2013.01); *G06F 11/3672* (2013.01); *G06F 2209/545* (2013.01)

(58) Field of Classification Search
None
See application file for complete search history.

(56) References Cited

U.S. PATENT DOCUMENTS

| | | | |
|---|---|---|---|
| 7,451,455 B1 * | 11/2008 | El-Haj | G06F 11/3664 719/320 |
| 7,665,066 B2 | 2/2010 | Sauer et al. | |
| 8,161,496 B2 | 4/2012 | Paliswiat et al. | |
| 2011/0055815 A1 * | 3/2011 | Squillace | G06F 11/3612 717/125 |

(Continued)

OTHER PUBLICATIONS

Wikipedia, Selenium, Nov. 26, 2018.

(Continued)

*Primary Examiner* — Wynuel S Aquino
*Assistant Examiner* — Mark A Gooray
(74) *Attorney, Agent, or Firm* — Ryan, Mason & Lewis, LLP (57) ABSTRACT

Methods, apparatus, and processor-readable storage media for system program change detection via parallel monitoring techniques are provided herein. An example computer-implemented method includes determining multiple user interface elements to monitor at each of one or more action points during execution of at least one system program within an automated testing framework, wherein the at least one system program is designed for operation across multiple at least partially interconnected system devices. The method also includes monitoring, in parallel, at a given one of the one or more action points, for changes to the multiple user interface elements corresponding to the given action point, and performing, based at least in part on the monitoring and on processing of one or more data structures, at least one action within the automated testing framework in response to detection of a change to any one of the multiple user interface elements.

17 Claims, 6 Drawing Sheets

(56) References Cited

U.S. PATENT DOCUMENTS

2013/0283246 A1* 10/2013 Krajec ................ G06F 11/3433
717/130
2015/0169158 A1* 6/2015 Kyte ..................... G06F 11/366
715/806

OTHER PUBLICATIONS

Wikipedia, Watir, Jun. 7, 2018.
Micro Focus, Unified Functional Testing (UFT), Dec. 19, 2018.
Micro Focus, Silk Mobile, Data Sheet, 2016.
Wikipedia, HP QuickTest Professional, Dec. 10, 2018.
Wikipedia, Rational Functional Tester, Apr. 26, 2018.
Medium, E2E Testing with NightWatch: Part One, Oct. 11, 2017.
Wikipedia, Katalon Studio, Dec. 19, 2018.
Wikipedia, Eggplant (software), Nov. 30, 2018.
Wikipedia, TestComplete, Nov. 19, 2018.

\* cited by examiner

```
public boolean exists(WebDriver driver, int wait, WebElement... elements) {
    if (elements.length >= 1) {
        for (int i = 0; i <= wait; i++) {
            for (int j = 0; j < elements.length; j++) {
                if ( exists(driver, ((wait > 0 && j == 0) ? 1 : 0), elements[j]) )
                    return true;
            }
        }
    }
    return false;
}
```
— 202

```
public boolean exists(WebDriver driver, int wait, WebElement element) {
    try {
        WebDriverWait exists = new WebDriverWait(driver, wait);
        ExpectedCondition visible = ExpectedConditions.visibilityOf(element);
        exists.until(ExpectedConditions.refreshed(visible));
        return true;
    }
    catch (StaleElementReferenceException|TimeoutException|NoSuchElementException e) {
        return false;
    }
}
```
— 204

302
```
public WebElement exists(WebDriver driver, int wait, WebElement... elements) {
    if (elements.length >= 1) {
        for (int i = 0; i <= wait; i++) {
            for (int j = 0; j < elements.length; j++) {
                if ( exists(driver, ((wait > 0 && j == 0) ? 1 : 0), elements[j]) )
                    return elements[j];
            }
        }
    }
    return null;
}
```

304
```
public boolean exists(WebDriver driver, int wait, WebElement element) {
    try {
        WebDriverWait exists = new WebDriverWait(driver, wait);
        ExpectedCondition visible = ExpectedConditions.visibilityOf(element);
        exists.until(ExpectedConditions.refreshed(visible));
        return true;
    }
    catch (StaleElementReferenceException|TimeoutException|NoSuchElementException e) {
        return false;
    }
}
```

SYSTEM PROGRAM CHANGE DETECTION VIA PARALLEL MONITORING TECHNIQUES

FIELD

The field relates generally to information processing systems, and more particularly to automated software testing in such systems.

BACKGROUND

Software running on inter-connected systems, while commonly having the versatility to handle a range of conditions such as various inputs, delays, states, and dependencies, can exhibit numerous behaviors during operation. Such behaviors can include both expected behaviors and unexpected behaviors, which can generate challenges in contexts such as automated software testing.

For example, conventional automated software testing processes include monitoring for a change in a specific user interface (UI) element resulting from a specific interaction, and any unexpected behaviors from the software can potentially cause delays and performance issues. Moreover, conventional automation tools are limited to serial monitoring of one specific UI element at a time during a testing procedure, wherein each such element includes its own distinct wait time and potential performance ramifications. Further, monitoring for the effect of an event against a single UI element over a given period of time can also lead to missed events in addition to the potentially significant delays in execution.

SUMMARY

Illustrative embodiments of the disclosure provide system program change detection via parallel monitoring techniques. An exemplary computer-implemented method includes determining multiple user interface elements to monitor at each of one or more action points during execution of at least one system program within an automated testing framework, wherein the at least one system program is designed for operation across multiple at least partially interconnected system devices. Such a method also includes monitoring, in parallel, at a given one of the one or more action points, for changes to the multiple user interface elements corresponding to the given action point. Further, such a method includes performing, based at least in part on the monitoring and on processing of one or more data structures, at least one action within the automated testing framework in response to detection of a change to any one of the multiple user interface elements. Such performances include determining which of the multiple user interface elements corresponds to the detected change, and determining the at least one action to be performed by processing the one or more data structures, wherein the data structures include information identifying actions that are conditional on user interface element changes, and wherein the processing includes mapping the determined user interface element and the detected change to the one or more data structures. Further, such performance includes triggering the at least one action determined via processing of the one or more data structures.

Illustrative embodiments can provide significant advantages relative to conventional automated software testing techniques. For example, challenges associated with serial monitoring-based delays are overcome through generating and implementing a mechanism that enables an automation engineer to define a series of elements that could be affected by interacting with a given set of one or more user interface elements.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
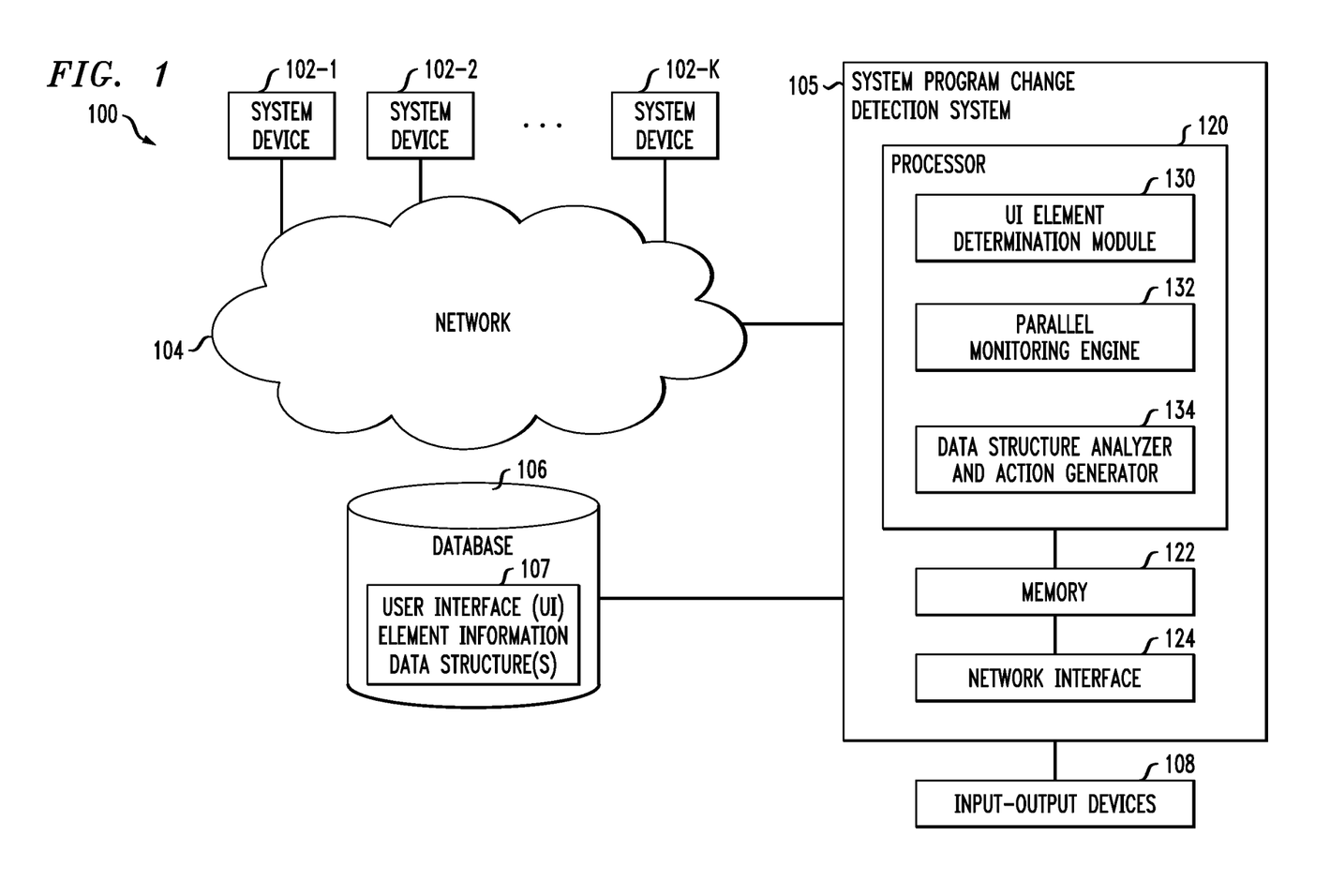
FIG. 1 shows an information processing system configured for system program change detection via parallel monitoring in an illustrative embodiment.

FIG. 1 shows a computer network (also referred to herein as an information processing system) 100 configured in accordance with an illustrative embodiment. The computer network 100 comprises a plurality of system devices 102-1, 102-2, . . . 102-K, collectively referred to herein as system devices 102. The system devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is system program change detection system 105.

The system devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The system devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" as used herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

As also depicted in FIG. 1, the system program change detection system 105 can have an associated database 106 configured to store data 107 pertaining to one or more UI element information data structures, which may comprise, for example, identification of UI elements and actions conditional on changes to those UI elements.

The database 106 in an example embodiment, such as depicted in FIG. 1, is implemented using one or more storage systems associated with the system program change detection system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the system program change detection system 105 are input-output devices 108, which illustratively comprise keyboards, displays or other types of input-output devices in any combination. Such input-output devices can be used, for example, to support one or more user interfaces to the system program change detection system 105, as well as to support communication between the system program change detection system 105 and other related systems and devices not explicitly shown.

The system program change detection system 105 in the FIG. 1 embodiment is assumed to be implemented using at least one processing device. Each such processing device generally comprises at least one processor and an associated memory, and implements one or more functional modules for controlling certain features of the system program change detection system 105.

More particularly, the system program change detection system 105 in the example embodiment depicted in FIG. 1 can comprise a processor 120 coupled to a memory 122 and a network interface 124.

The processor 120 illustratively comprises, for example, a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. Additionally, the term "article of manufacture" as used herein should be understood to exclude transitory, propagating signals.

The network interface 124 allows the system program change detection system 105 to communicate over the network 104 with the system devices 102, and illustratively comprises one or more conventional transceivers.

The processor 120 further comprises a UI element determination module 130, a parallel monitoring engine 132, and a data structure analyzer and action generator 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the UI element determination module 130, parallel monitoring engine 132, and data structure analyzer and action generator 134 may be implemented at least in part in the form of software that is stored in memory 122 and executed by processor 120.

It is to be understood that the particular set of elements shown in FIG. 1 for system program change detection via parallel monitoring techniques involving system devices 102 of computer network 100 is presented by way of illustrative example only, and in other embodiments additional or alternative elements may be used. Thus, another embodiment may include additional or alternative systems, devices and other network entities, as well as different arrangements of modules and other components.

An exemplary process utilizing UI element determination module 130, parallel monitoring engine 132, and data structure analyzer and action generator 134 of the system program change detection system 105 in computer network 100 will be described in more detail with reference to the flow diagram of FIG. 5.

Accordingly, at least one embodiment of the in invention includes adding a degree of artificial intelligence to the system program change detection system via parallel monitoring. For example, such an embodiment can include monitoring, during an automated software testing procedure, multiple UI elements simultaneously, wherein the multiple UI elements can include as many elements as might indicate the occurrence of a perceivable event to distinguish and/or determine when an action has completed and what the action's effect (on the software/system program) was.

Additionally, in accordance with one or more embodiments, a series of UI elements to be monitored can be defined, and such a defined listing can be implemented in connection with one or more automation tools. In such an embodiment, an automated (system program/software) testing framework and/or mechanism can be designed, modified and/or implemented to cycle through a variable number of UI elements during monitoring phases until a matching condition for any one of the UI elements is found, or a pre-determined allotted amount of time has expired. As such, after performing an action (for example, clicking a button from the automated test framework), one or more embodiments can include monitoring for changes across the multiple pre-defined UI elements simultaneously over a given period of time (for instance, the automated testing framework can detect if any of the UI elements has become displayed).

Figure 2:
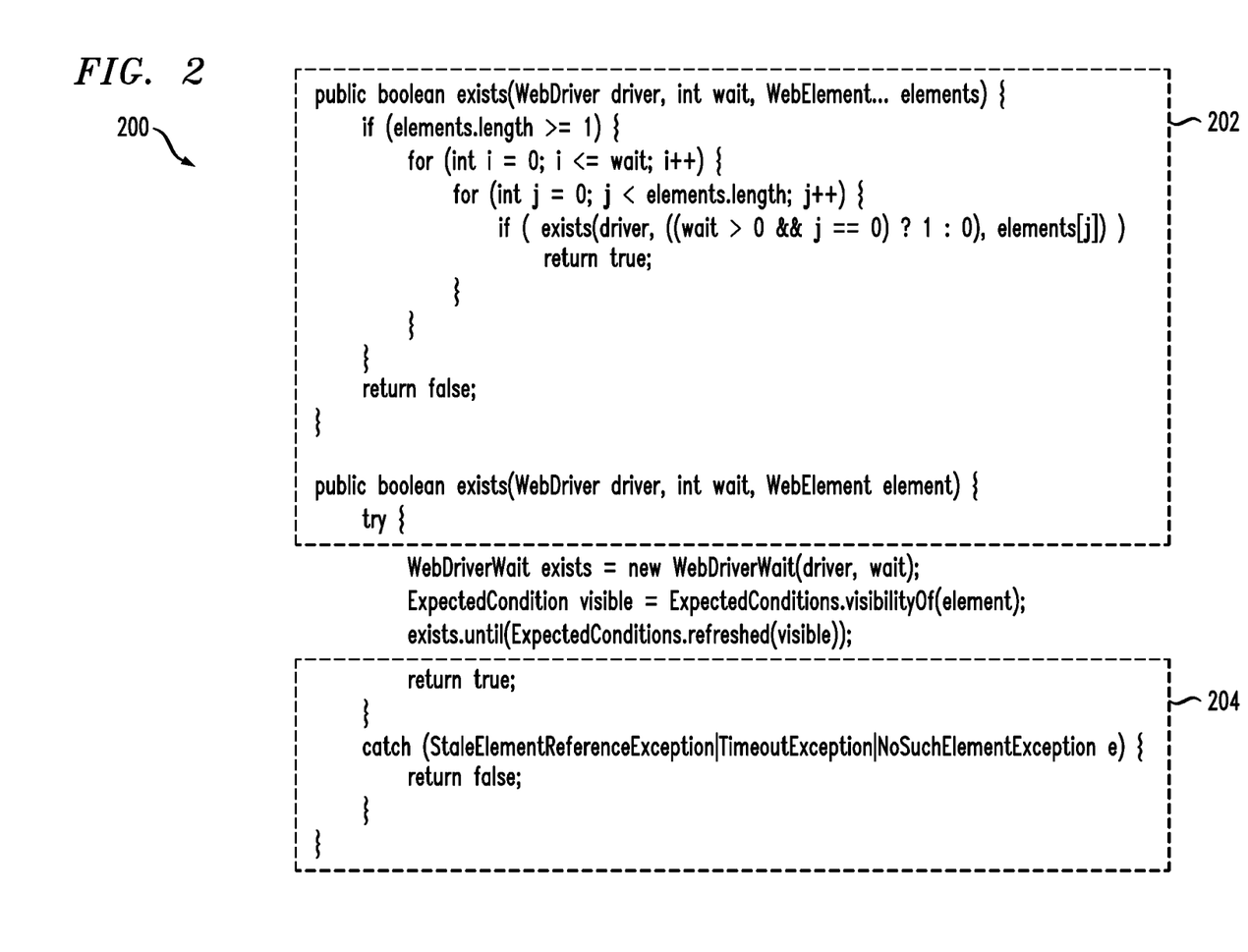
FIG. 2 shows example pseudocode for system program change detection via parallel monitoring in an illustrative embodiment.
Figure 3:
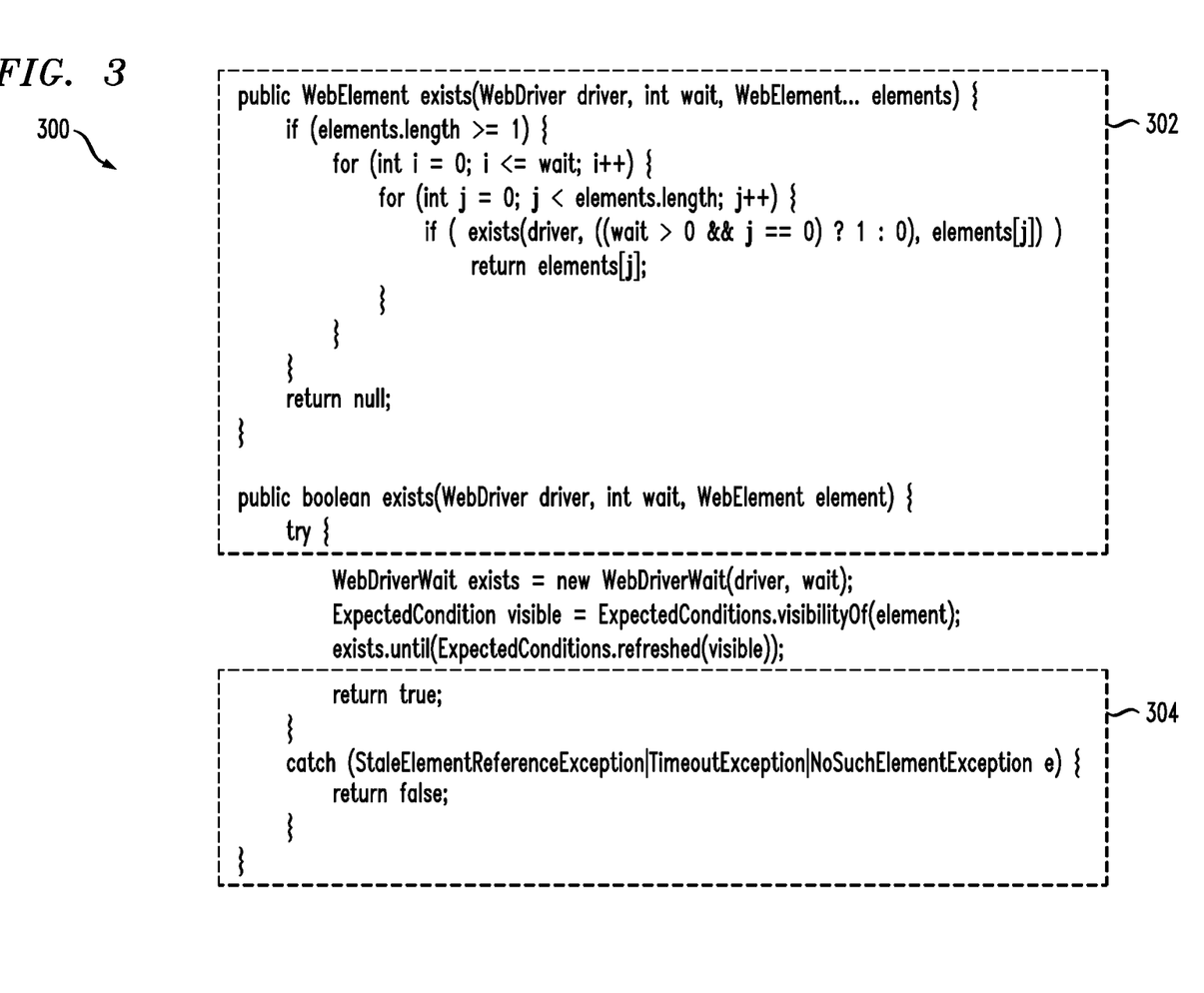
FIG. 3 shows example pseudocode for system program change detection via parallel monitoring in an illustrative embodiment.

FIG. 2 and FIG. 3 show example pseudocode for system program change detection via parallel monitoring in an illustrative embodiment.

In such embodiments, pseudocode 200 and pseudocode 300 can be executed by or under the control of a processing device, such as system program change detection system 105, or another type of processing device or system. The pseudocode 200 particularly illustrates code portions 202 and 204, while pseudocode 300 particularly illustrates code portions 302 and 304 (which is analogous to code portion 204), which represent implementations of code directed to parallel monitoring functionalities of example embodiments, and which are not present in conventional testing frameworks.

For example, code portion 202 iterates through an object array of type WebElement. For the first element of the array, code portion 202 supplies a wait time of one (1) second when it (i.e., code portion 202) calls code portion 204 to check if the element exists (in the document object model (DOM)). For all other objects in the array, code portion 202 will use a wait time of zero (0) seconds when it calls code portion 204. If code portion 204 (or 304) reports that the supplied element does exist in the DOM (and thus returns true), then code portion 202 will also immediately return "true" to relay that message back to the caller. Alternatively, as illustrated in the FIG. 3 example, code portion 302 can return the specific element (being checked) that was found. If 204 (or 304) has returned an output of "false," signifying that the element does not exist in the DOM, then the pseudocode 200 (or 300) iterates for a subsequent second, until an element is found or time expires.

Additionally, code portions 204 and 304 can be referred to as "wrapper" or "helper" methods. Such code portions can call into an automated testing framework's default wait logic to determine if a particular element exists in the DOM, and can continue scanning the DOM for the length of time specified. In the case of a positive result, the affirmative can be returned to code portion 202 (in the form of a "true" Boolean value). Not finding an element can result in one or more types of exception and/or errors to be output, depending upon the reason, which can be interpreted and identified via code portion 202 (in the form of a "false" Boolean value). It is to be appreciated that these particular pseudocode depictions show merely example implementations of a system program change detection system, and alternative implementations of the process can be used in other embodiments.

Figure 4:
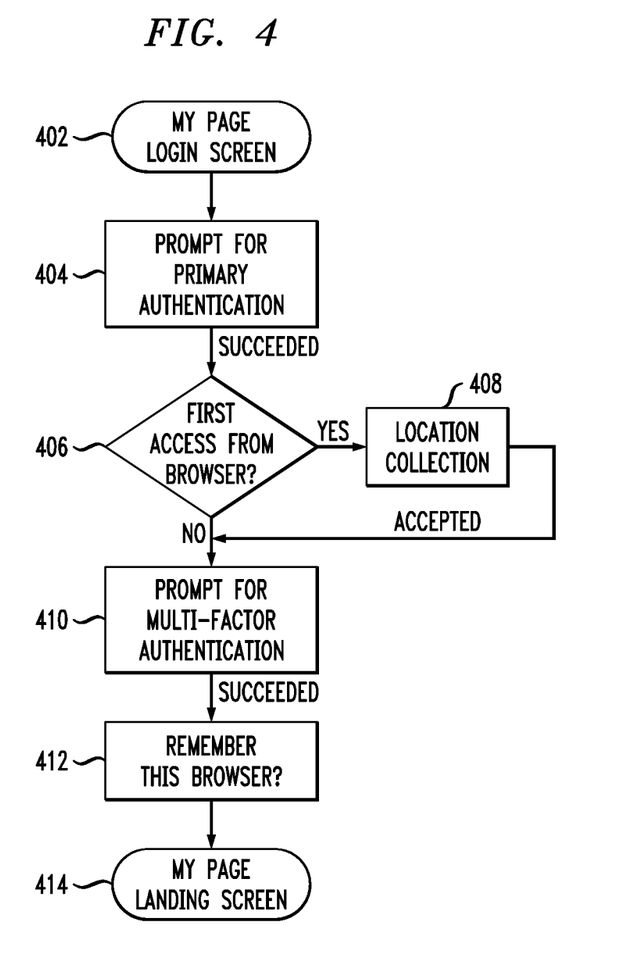
FIG. 4 shows an example workflow of a user signing-in to a protected resource, in accordance with an illustrative embodiment.

FIG. 4 shows an example workflow of a user signing-in to a protected resource, in accordance with an illustrative embodiment. Step 402 includes presentation of a login screen, which is followed by a prompt for primary authentication (for example, password authentication) in step 404. Upon a successful resolution of such a prompt, step 406 includes determining whether this is the first access attempt in a new browser instance. If yes (that is, this is the first access attempted in a new browser instance), step 408 includes a location collection process. If no (that is, this is not the first access attempted in a new browser instance), or after the location collection process in step 408, step 410 includes a prompt for multi-factor authentication (MFA). Upon a successful resolution of such a prompt, step 412 includes determining whether the browser in question is remembered (by the system and/or framework) from a previous instance, and based at least in part on the resolution of that query, step 414 includes presentation of a landing screen for the user's page.

As detailed above and illustrated in the FIG. 4 example, when an end user signs into his or her login page for the first time in a new browser instance, the user can be prompted with a location collection informational dialog (step 408, for example). One or more embodiments can include anticipating this dialog's presence during every login attempt, whether it is the first attempt in this browser instance (and thus its presence is expected) or in case the dialog is shown in error. Under conventional automated testing approaches, execution of the system program will be halted until this location collection informational dialog is presented (or the allotted monitoring time expires). The conventional automated testing approach subsequently ensures that the next screen (prompt 410, for example) has been displayed as well (after waiting again).

In contrast, one or more embodiments of the disclosure include monitoring, in parallel, for the appearance (within a pre-determined amount of time) of both the location collection informational dialog and the MFA prompt 410 that would appear after the location collection informational dialog 408 is dismissed. If the system first detects the MFA prompt 410, execution of the system program will not be delayed by waiting for the location collection informational dialog 408 (which will not appear). It is only if location collection informational dialog 408 appears before the MFA prompt 410 that an embodiment will include interacting with the location collection informational dialog 408.

Similarly, when performing verification of user input (in connection with prompt 404 and/or prompt 410), an in-line error may be encountered. Conventional automated testing approaches monitor to see if this error text will appear, whether it is expected or not. After a time-out elapses, the conventional automated testing approaches will then monitor for the next screen that should be displayed (which likely will include some delay). In contrast, one or more embodiments of the disclosure include monitoring for the error message in addition to the next screen. In the case of prompt 404, such an embodiment would monitor for (in addition to the inline error) a key element from either determination 406 or prompt 410. In the case of prompt 410, such an embodiment would monitor for (in addition to the inline error) a key element from either determination 412 or landing screen 414. If the error is displayed, such an embodiment can ensure that the condition is expected. If the next screen displays first (that is, prior to the error), such an embodiment can (efficiently) verify that an error is not expected and continue with the execution of the system program without additional delay.

As such, in accordance with one or more embodiments, by not spending time waiting for a single UI element or object which may or may not exhibit a predicted behavior, particularly in situations that occur less frequently, there are significant increases in performance and failure detection that can be realized by not blocking system program execution and instead monitoring for multiple conditions.

Figure 5:
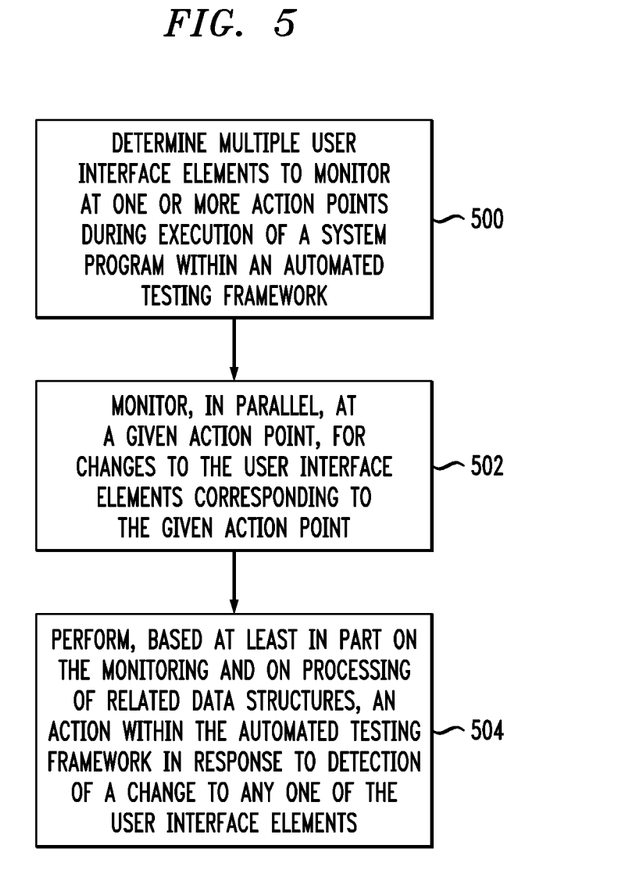
FIG. 5 is a flow diagram of a process for system program change detection via parallel monitoring in an illustrative embodiment.

FIG. 5 is a flow diagram of a process for system program change detection via parallel monitoring in an illustrative embodiment. It is to be understood that this particular process is only an example, and additional or alternative processes can be carried out in other embodiments.

In this embodiment, the process includes steps 500 through 504. These steps are assumed to be performed by the processor 120 utilizing its modules 130, 132 and 134.

Step 500 includes determining multiple user interface elements to monitor at each of one or more action points during execution of at least one system program within an automated testing framework, wherein the at least one system program is designed for operation across multiple at least partially interconnected system devices. In one or more embodiments, the multiple user interface elements can include one or more dialog elements, one or more user interface elements predicted in response to at least one action at a given one of the action points, etc. Additionally, determining the multiple user interface elements to monitor can include, for example, defining multiple expected behaviors that the at least one system program can exhibit during execution.

Step 502 includes monitoring, in parallel, at a given one of the one or more action points, for changes to the multiple user interface elements corresponding to the given action point. Such changes can include, for example, display of the user interface elements. Also, such monitoring can include reading a DOM pertaining to the at least one system program and matching user interface elements to the DOM on a many-to-many basis. Such a DOM can include, for example, the specification of every object that appears (on the screen) during execution of the at least one system program along with all attributes pertaining to the objects. Accordingly, one or more embodiments can include continuously reading and/or polling the DOM for the at least one system program until a match and/or hit on the criteria being matched pertaining to any one of the multiple user interface elements (for example, such criteria can include a UI element's name, class, identifier (ID), text content, etc.). Additionally, as noted above, one or more embodiments include an ability to poll and match for an unlimited number of UI elements, thus being able to match on a many-to-many basis.

Step 504 includes performing, based at least in part on the monitoring step and on processing of one or more data structures, at least one action within the automated testing framework in response to detection of a change to any one of the multiple user interface elements. Such a performance step can include determining which of the multiple user interface elements corresponds to the detected change, and determining the at least one action to be performed by processing the one or more data structures, wherein the one or more data structures include information identifying actions that are conditional on user interface element changes, and wherein the processing includes mapping the determined user interface element and the detected change to the one or more data structures. Additionally, such a performance step can include triggering the at least one action determined via processing of the one or more data structures. In at least one embodiment, the at least one action can include continuation of the execution of the at least one system program within the automated testing framework, blocking the execution of the at least one system program within the automated testing framework, etc.

The techniques depicted in FIG. 5 can also include instructing the at least one processing device to perform one or more actions against at least one of the multiple user interface elements. Also, one or more embodiments can include assigning a temporal limitation to the monitoring step. In such an embodiment, performing the at least one action is further based on expiration of the temporal limitation assigned to the monitoring step.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to carry out parallel monitoring (which can include polling and matching the DOM on a many-to-many basis). These and other embodiments can effectively reduce the execution time of an automated testing framework, which can result in the consumption of fewer network resources, shortening continuous integration test cycles, and increasing the accuracy of detection for failure cases.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments of the disclosure, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
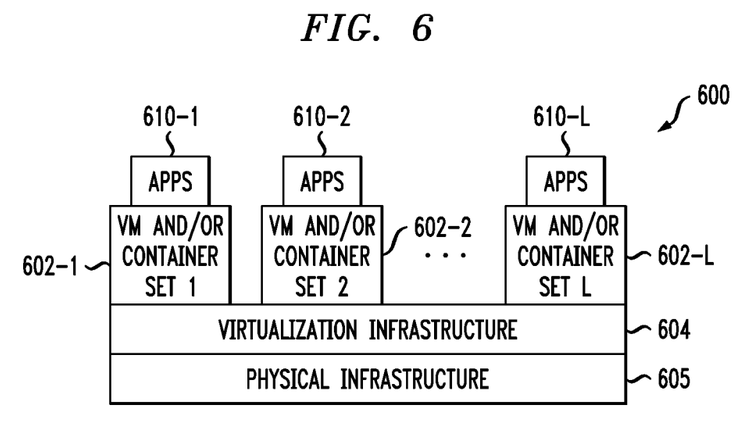
FIGS. 6 and 7 show examples of processing platforms that may be utilized to implement at least a portion of an information processing system in illustrative embodiments.
Figure 7:
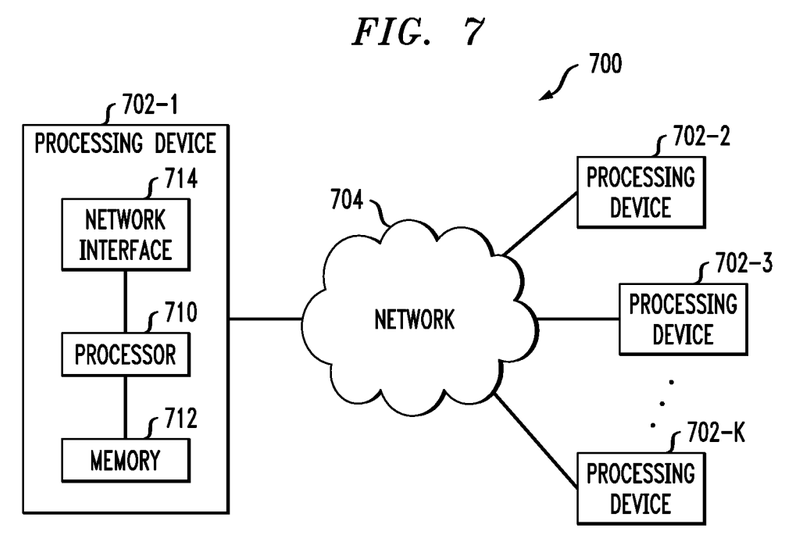

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
defining a series of multiple user interface elements to monitor, in a particular sequence in accordance with the defined series, at each of one or more action points associated with at least one system program designed for execution across multiple at least partially interconnected system devices within an automated testing framework, wherein defining the series of multiple user interface elements to monitor comprises:
   defining multiple expected behaviors that the at least one system program can exhibit during execution at at least one of the one or more action points;
   defining a wait time for monitoring for a change to a first of the multiple user interface elements, comprising:
      defining a first wait time for determining that the first of the multiple user interface elements exists in a document object model pertaining to the at least one system program; and
      defining, upon a determination that the first wait time expires, a second wait time for determining that the first of the multiple user interface elements exists in the document object model pertaining to the at least one system program; and
   defining an iteration process for monitoring, without a wait time, for a change to each remaining user interface element among the multiple user interface elements;
   wherein the multiple user interface elements comprise two or more user interface elements predicted in response to at least one user action carried out at at least one of the one or more action points;
monitoring, in accordance with the defined series, including the defined first wait time and the defined second wait time, and during execution of the at least one system program within the automated testing framework, at a given one of the one or more action points, for changes to the multiple user interface elements corresponding to the given action point until a matching user interface element-specific change condition for any one of the multiple user interface elements is identified, and wherein monitoring comprises reading the document object model pertaining to the at least one system program and matching at least a portion of the multiple user interface elements to the document object model on a many-to-many basis; and
performing, based at least in part on the monitoring and on processing of one or more data structures, at least one action within the automated testing framework in response to detection of a change to any one of the multiple user interface elements, wherein performing the at least one action comprises:
   determining which of the multiple user interface elements corresponds to the detected change;
   determining the at least one action to be performed by processing the one or more data structures, wherein the one or more data structures comprise information identifying actions that are conditional on user interface element changes, and wherein the processing comprises mapping the determined user interface element and the detected change to the one or more data structures; and
   triggering the at least one action determined via processing of the one or more data structures;
wherein the method is performed by at least one processing device comprising a processor coupled to a memory.

2. The computer-implemented method of claim 1, wherein the multiple user interface elements comprise one or more dialog elements.

3. The computer-implemented method of claim 1, further comprising:
instructing the at least one processing device to perform one or more actions against at least one of the multiple user interface elements.

4. The computer-implemented method of claim 1, further comprising:
assigning a temporal limitation to the monitoring.

5. The computer-implemented method of claim 4, wherein performing the at least one action is further based on expiration of the temporal limitation assigned to the monitoring.

6. The computer-implemented method of claim 1, wherein the changes to the multiple user interface elements comprises display of the multiple user interface elements.

7. The computer-implemented method of claim 1, wherein the at least one action comprises continuation of the execution of the at least one system program within the automated testing framework.

8. The computer-implemented method of claim 1, wherein the at least one action comprises blocking the execution of the at least one system program within the automated testing framework.

9. A non-transitory processor-readable storage medium having stored therein program code of one or more software programs, wherein the program code when executed by at least one processing device causes the at least one processing device:
to define a series of multiple user interface elements to monitor, in a particular sequence in accordance with the defined series, at each of one or more action points associated with at least one system program designed for execution across multiple at least partially interconnected system devices within an automated testing framework, wherein defining the series of multiple user interface elements to monitor comprises:
defining multiple expected behaviors that the at least one system program can exhibit during execution at at least one of the one or more action points;
defining a wait time for monitoring for a change to a first of the multiple user interface elements, comprising:
defining a first wait time for determining that the first of the multiple user interface elements exists in a document object model pertaining to the at least one system program; and
defining, upon a determination that the first wait time expires, a second wait time for determining that the first of the multiple user interface elements exists in the document object model pertaining to the at least one system program; and
defining an iteration process for monitoring, without a wait time, for a change to each remaining user interface element among the multiple user interface elements;
wherein the multiple user interface elements comprise two or more user interface elements predicted in response to at least one user action carried out at at least one of the one or more action points;
to monitor, in accordance with the defined series, including the defined first wait time and the defined second wait time, and during execution of the at least one system program within the automated testing framework, at a given one of the one or more action points, for changes to the multiple user interface elements corresponding to the given action point until a matching user interface element-specific change condition for any one of the multiple user interface elements is identified, and wherein monitoring comprises reading the document object model pertaining to the at least one system program and matching at least a portion of the multiple user interface elements to the document object model on a many-to-many basis; and
to perform, based at least in part on the monitoring and on processing of one or more data structures, at least one action within the automated testing framework in response to detection of a change to any one of the multiple user interface elements, wherein performing the at least one action comprises:
determining which of the multiple user interface elements corresponds to the detected change;
determining the at least one action to be performed by processing the one or more data structures, wherein the one or more data structures comprise information identifying actions that are conditional on user interface element changes, and wherein the processing comprises mapping the determined user interface element and the detected change to the one or more data structures; and
triggering the at least one action determined via processing of the one or more data structures.

10. The non-transitory processor-readable storage medium of claim 9, wherein the multiple user interface elements comprise one or more dialog elements.

11. The non-transitory processor-readable storage medium of claim 9, wherein the program code when executed by the at least one processing device causes the at least one processing device to assign a temporal limitation to the monitoring, and wherein performing the at least one action is further based on expiration of the temporal limitation assigned to the monitoring.

12. The non-transitory processor-readable storage medium of claim 9, wherein the at least one action comprises continuation of the execution of the at least one system program within the automated testing framework.

13. The non-transitory processor-readable storage medium of claim 9, wherein the at least one action comprises blocking the execution of the at least one system program within the automated testing framework.

14. An apparatus comprising:
at least one processing device comprising a processor coupled to a memory;
the at least one processing device being configured:
to define a series of multiple user interface elements to monitor, in a particular sequence in accordance with the defined series, at each of one or more action points associated with at least one system program designed for execution across multiple at least partially interconnected system devices within an automated testing framework, wherein defining the series of multiple user interface elements to monitor comprises:
defining multiple expected behaviors that the at least one system program can exhibit during execution at at least one of the one or more action points;
defining a wait time for monitoring for a change to a first of the multiple user interface elements, comprising:
defining a first wait time for determining that the first of the multiple user interface elements exists in a document object model pertaining to the at least one system program; and
defining, upon a determination that the first wait time expires, a second wait time for determining that the first of the multiple user interface elements exists in the document object model pertaining to the at least one system program; and
defining an iteration process for monitoring, without a wait time, for a change to each remaining user interface element among the multiple user interface elements;
wherein the multiple user interface elements comprise two or more user interface elements predicted in response to at least one user action carried out at at least one of the one or more action points;

to monitor, in accordance with the defined series, including the defined first wait time and the defined second wait time, and during execution of the at least one system program within the automated testing framework, at a given one of the one or more action points, for changes to the multiple user interface elements corresponding to the given action point until a matching user interface element-specific change condition for any one of the multiple user interface elements is identified, and wherein monitoring comprises reading the document object model pertaining to the at least one system program and matching at least a portion of the multiple user interface elements to the document object model on a many-to-many basis; and to perform, based at least in part on the monitoring and on processing of one or more data structures, at least one action within the automated testing framework in response to detection of a change to any one of the multiple user interface elements, wherein performing the at least one action comprises:

determining which of the multiple user interface elements corresponds to the detected change;

determining the at least one action to be performed by processing the one or more data structures, wherein the one or more data structures comprise information identifying actions that are conditional on user interface element changes, and wherein the processing comprises mapping the determined user interface element and the detected change to the one or more data structures; and triggering the at least one action determined via processing of the one or more data structures.

15. The apparatus of claim 14, wherein the at least one processing device is further configured to assign a temporal limitation to the monitoring, and wherein performing the at least one action is further based on expiration of the temporal limitation assigned to the monitoring.

16. The apparatus of claim 14, wherein the at least one action comprises continuation of the execution of the at least one system program within the automated testing framework.

17. The apparatus of claim 14, wherein the at least one action comprises blocking the execution of the at least one system program within the automated testing framework.

* * * * *